United States Patent
Nagel et al.

(10) Patent No.: US 6,395,202 B1
(45) Date of Patent: *May 28, 2002

(54) METHOD FOR PRODUCING A MOLDED PART

(75) Inventors: Alwin Nagel, Kongen; Dirk Rogowski, Bunzwangen, both of (DE)

(73) Assignee: Cerasiv GmbH, Plochingen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/495,835

(22) Filed: Feb. 1, 2000

Related U.S. Application Data

(63) Continuation of application No. 08/624,376, filed on Jul. 15, 1996, now Pat. No. 6,123,878.

(30) Foreign Application Priority Data

Oct. 2, 1993 (DE) .......................................... 43 33 639

(51) Int. Cl.⁷ ............................................. B29C 35/02
(52) U.S. Cl. ................................ 264/28; 264/44; 419/2
(58) Field of Search ............................... 264/28, 86, 87, 264/219, 319, 44; 419/2

(56) References Cited

U.S. PATENT DOCUMENTS

| | | | | |
|---|---|---|---|---|
| 4,448,857 A | * | 5/1984 | Iacovangelo | 429/41 |
| 4,814,300 A | * | 3/1989 | Helferich | 501/84 |
| 4,849,285 A | * | 7/1989 | Dillan | 428/330 |
| 5,306,677 A | * | 4/1994 | Newkirk et al. | 501/127 |
| 5,358,914 A | * | 10/1994 | Newkirk et al. | 501/127 |
| 6,123,878 A | * | 9/2000 | Nagel et al. | 264/28 |

FOREIGN PATENT DOCUMENTS

DE          4238142          * 5/1994

* cited by examiner

Primary Examiner—Christopher A. Fiorilla
(74) Attorney, Agent, or Firm—Fulbright & Jaworski, L.L.P.

(57) ABSTRACT

Method for producing highly porus, self-supporting molded part that has a metallic or nonmetallic solid phase and at least one binder. The porosity is 50–90 vol. %

14 Claims, 2 Drawing Sheets

METHOD FOR PRODUCING A MOLDED PART

This application is a continuation of Ser. No. 08/624,326 filed Jul. 15, 1996 now U.S. Pat. No. 6,123,878. which is based on PCT/EP94/03265 filed Sep. 30, 1994.

BACKGROUND AND SUMMARY OF THE INVENTION

The present invention has, as its object, self-supporting, highly porous molded parts, made by the methods of powder metallurgy, consisting of metallic or nonmetallic solids, processes for their production, and the use of the molded parts according to the invention.

Porous, molded ceramic parts are known in and of themselves. They are produced, for example, by the use of organic foam elements, which are saturated with a ceramic slip. After the organic components have been dried and burned off, a porous molded ceramic body remains behind as a negative of the foam element (so-called "lost form" process; DE-OS 23 01 662). Another possibility consists in the direct foaming of a ceramic slip in a mold by the use blowing agents, followed by drying. It is also possible to use organic fillers as pore-forming agents in ceramic compositions for the production of porous molded bodies. The porous foam bodies known according to the state of the art suffer from the following disadvantages:

- there is a limit on the achievable pore fraction;
- a closed porosity is formed;
- the pore distribution is inhomogeneous on the microscopic scale;
- a large amount of organic filler is required;
- the production process is very time-consuming; and
- the processes are limited to fine powders.

A process for the production of fine-pored solid bodies with a high pore volume is described in DE-OS 41 02 430. In this process, a coarsely dispersed, sedimentable mixture of a liquid phase and solid particles is allowed to separate by sedimentation, and the sediment is solidified in the presence of the liquid phase by a chemical reaction between the sediment particles to form a porous body, which has sufficient dimensional stability for a heat treatment. These solid bodies are then sintered at a temperature of preferably more than 1,000° C. The disadvantage of this process is that the liquid phase and the sediment particles must be chosen to cooperate with each other in such a way that a chemical reaction will occur between the sediment particles. The sediment particles are bonded to each other directly by the chemical reaction, i.e., without a binder. As a result, monophase, fine-pored solid bodies are obtained.

Solid, porous ceramic bodies have many uses. They are suitable, for example, for use as light-weight construction blocks; as support material for other liquid or solid phases; and as insulation, construction, filler, or filter material. A special area of application for porous molded ceramic bodies has opened up only recently. To reduce the total weight of motor vehicles, increasing use is being made of light-weight construction materials in passenger cars. To ensure the necessary strength values, porous ceramic molded bodies are infiltrated with light metal alloys.

The task of the present invention is to provide porous molded ceramic bodies which can be produced by the methods of powder metallurgy and which do not suffer from the disadvantages of the known porous molded bodies according to the state of the art.

DETAILED DESCRIPTION OF THE INVENTION

Figure 1:
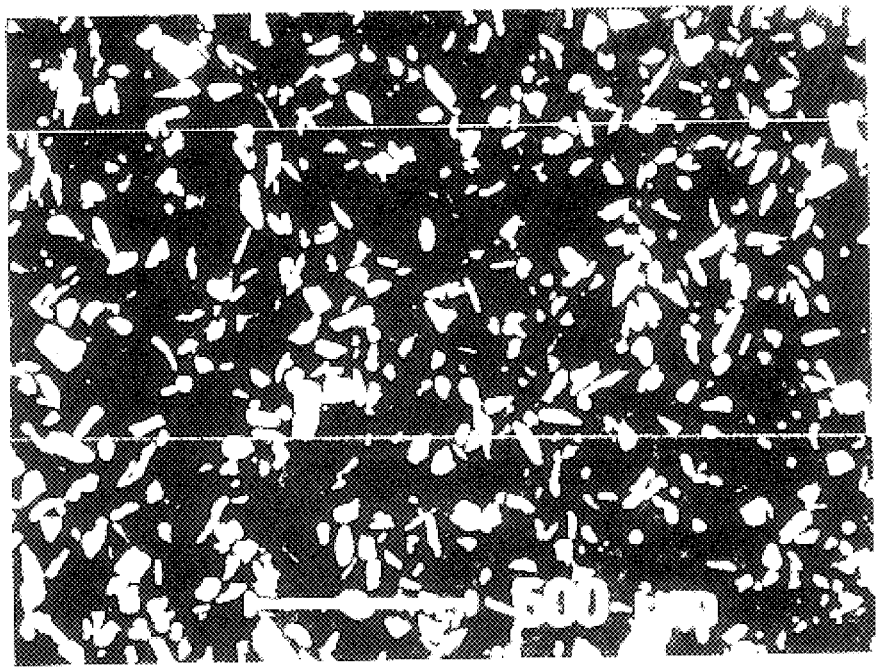
FIG. 1 is a measurement window showing the homogeneity characteristic of a highly porous molded body.

This task is accomplished in that the methods of powder metallurgy are used to produce a highly porous, self-supporting molded part, which consists of metallic or non-metallic solids (solid phase(s)), at least one binder (binder phase(s)), and pores. The solid phase can be either a single substance or a mixture and can consist of organic powders such as carbon; natural or synthetic polymers; metallic components such as copper, brass, bronze, magnesium, zinc, lead, aluminum, silicon, titanium, vanadium, manganese, iron, cobalt, chromium, molybdenum, or nickel; intermetallic phases of the elements; carbides, nitrides, silicides, borides, or oxides of the elements; combinations such as TiCN or $FeB_x$; or mixtures of these components. The solids are used in amounts of 10–40 vol. %, preferably 15–30 vol. %. The particle size can vary from 0.5 to 500 $\mu$m, preferably from 1 to 200 $\mu$m, and can be adjusted in the individual case to suit the specific application in question. If desired, additives can also be present. These include substances such as molybdenum sulfide and graphite, which are relatively soft in comparison to the solid materials.

The inorganic binders which can be used are those which bind the solid particles to each other without the requirement for a chemical reaction between the solid particles to achieve the bonding. Suitable binders include, for example, those based on phosphate, borate, sulfate, oxide, or silicate; soda-water glass in amounts of 1–15 vol. %, preferably of 3–7.0 vol. %, is especially preferred. Bentonite can also be used. The particle size of the powder of the selected binder can vary from 0.1 to 30 $\mu$m. Depending on the application in question, the melting points and/or wetting behavior of the inorganic binders can be modified by the addition of, for example, alkalis, alkaline earths, boron, or similar substances.

The porosity of the molded bodies according to the invention can be in the range of 50–90%. The pore size distribution is to be adjusted by means of the size distribution of the solid materials used and of the inorganic binder and also by means of the selected heat treatment.

According to the invention, the molded parts are produced in the following way. The components, consisting of solid powder, inorganic binder(s), organic binder(s), and possibly selected additives, are mixed and dispersed in water by means of, for example, a conventional agitator or a high-speed dissolver. The organic binder consists of water-soluble and/or dispersible substances such as methylcellulose, polyvinyl alcohol, alginate, starch, or agar-agar or possibly combinations of these substances. During the production of the slip, it is possible to add an extender such as bentonite to increase the viscosity, as a result of which sedimentation or separation can be avoided. Foaming can be prevented by the addition of an antifoaming agent. To facilitate the dissolving of the auxiliary materials, the casting slip can be heated while it is being agitated, possibly to temperatures above 90° C. Depending on the selected organic binder, the slip is then cast into the negative casting mold corresponding to the molded part either by the gel casting method or by the freeze casting method. The casting mold can consist of any desired smooth, nonporous material such as aluminum, plastic, or steel; its dimensions must be adjusted to take account of the subsequent homogeneous dimensional changes which occur as a result of shrinkage during the drying process or the heat treatment. Depending on the desired geometry, the casting mold can be made in sections. When the freeze casting method is used, the mold can also be designed like a conventional injection molding die for the processing of plastic. The injection rate in this case depends on the offset and on the geometry and is adjustable. The injection pressure can be varied from 10 kPa to pressures as high as 100 MPa, depending the adjusted viscosity. It is advantageous to coat the casting molds with a mold-release agent such as soap, fat, or oil before the casting operation.

When an organic binder with a temperature-related sol-gel transition is used, e.g., starch or agar-agar, the slip is cast hot by the gel casting method into the negative casting mold, in which it solidifies as it cools. After the molded part has gelled, it can be removed from the mold and then frozen, or the unmolding operation can be carried out in the frozen state, if this is necessary for reasons of stability as in the case of parts with thin walls, for example. When a nongelling organic binder such as methylcellulose or polyvinyl alcohol is used, the slip is cast by the freeze casting method at temperatures of 0–30° C. into a mold which has been prechilled to −60 to −5° C. The water fraction freezes at temperatures of −30 to 0° C., depending on the dissolved binders and salts. The slip is thus fixed in a homogeneous state and solidified. After the molded part has been removed from the chillable mold, it can be stored in the chilled state to await further processing.

The frozen molded part thus obtained is then dried in a vacuum of no more than 600 Pa (6 mbars) at a temperature low enough to ensure that no area of the molded part will melt, e.g., at temperatures of 0–60° C.

During this drying process, the conditions must also be selected to ensure that drying does not occur too rapidly and therefore inhomogeneously. It can be guaranteed in this way that no cracks will form during the linear shrinkage of 1–8% which occurs during the drying process. The drying time depends on the geometry and wall thickness of the molded part can take as long as 100 hours. The dried green compact consists of solid particles crosslinked with the organic binder(s) and the uniformly distributed inorganic binder components.

During the following heat treatment, the organic binder fraction is driven off, and a pore structure is created which can be easily infiltrated. The inorganic binder cures or melts during this thermal process and thus binds (glues) the solid grains to each other. The green compact is heated at least to such a point that the organic fraction and any crystal water which may be present are expelled. In addition, it must also be guaranteed that the inorganic binder can cure or melt so as to bond the solid particles to each other. The temperature required for this operation therefore depends on the selected inorganic binder. Sintering temperatures are not required. In general, it is sufficient to heat the green compact to 600–1,500° C. in air, at a heating rate of 50–2,000 K/h, in a shield gas atmosphere or under vacuum and to hold it at the maximum temperature for 0–5 hours. Inert conditions are required when oxidation-sensitive solids or binder systems are being used. The organic fractions as well as any water of crystallization which may be present will be driven off at temperatures of less than 500° C.

If necessary, the molded part obtained can be subjected to mechanical processing such as turning, milling, drilling, grinding, or the like.

Figure 2:
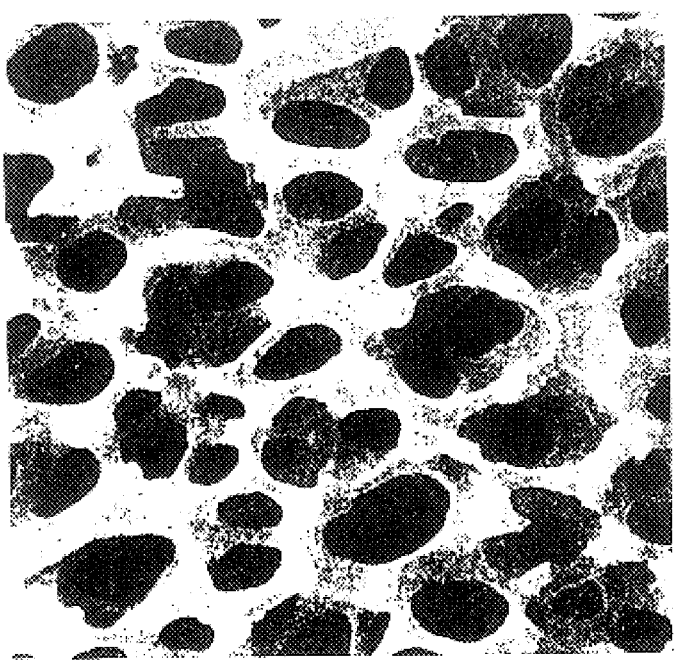
FIG. 2 is a measurement window showing the homogeneity characteristic of a molded body produced by a foaming method.
Figure 3:
FIG. 3 is micrograph of a molded body produced by a foam process, showing pores

In this way, two-phase, self-supporting, highly porous molded parts are obtained, which are characterized by excellent homogeneity with respect to the distribution of the solid/binder phase(s) and also with respect to the pores. "Two-phase" according to the invention means that the molded part according to the invention consists of a solid phase and a binder phase. Both the solid and the binder phases, however, can also consist of one or more components. The so-called "square grid" method can be used to provide a qualitative and quantitative description of the distribution homogeneities of the molded parts according to the invention (H. Wendrock, G. Ehrlich: *Homogenitätsbeurteilung von mehrphasigen Festkörpern und Festkörpergemischen* [*Evaluation of the Homogeneity of Multi-Phase Solids and Mixtures of Solids*], ZFW Dresden, 1990). The polished sections prepared for the examination of the microstructure are divided into square measurement windows. Over the course of several measurement series, each with a different size of measurement window, either the number of objects or the percentage of the surface area is determined for a statistically sufficient number of test squares, and the standard deviation is calculated. The measurement windows can be evaluated in either a semiautomatic or a completely automatic manner by means of point, line, or area analysis. When the standard deviation is related to the size (or edge length) of the corresponding measurement window, a point is found at which the standard deviation begins to increase conspicuously. This point is proposed as the "homogeneity characteristic" (FIG. 1). In the case of the highly porous molded bodies according to the invention, this value is approximately 150–250 $\mu$m (FIG. 2 1). In the case of porous molded bodies produced by, for example, a foaming method with pore sizes of 1–4 mm, the homogeneity boundary is 3,000–10,000 $\mu$m (FIG. 3 2). Even in the case of pore sizes of only a few hundred $\mu$m, the limit is still at 500–1,000 $\mu$m. With even smaller pores, a high porosity fraction can no longer be reached.

Another advantage of the molded bodies according to the invention is to be found in the especially favorable ratio of the pore size to the particle size.

Figure 4:
FIG. 4 is another micrograph of a molded body produced by a foam process.

Whereas, for example, the molded bodies produced by the foam process have pores—even when they are relatively small—which are up to several powers of ten larger than the average particle size of the solid materials used, (FIGS. 4 3 and 5 4), the pores of the molded bodies according to the invention are only 2–5 times larger than the average particle size of the selected solid materials.

The molded parts according to the invention can be used, for example, to produce solid-reinforced structural components and light-weight construction blocks, as support material for other liquid or solid phases; and as insulation, construction, filler, or filter material. The high porosity of the molded parts according to the invention even allow the molded parts to be infiltrated with conventional subeutectic recasting alloys by the use of conventional recasting processes.

Because of the high porosity of the molded parts according to the invention, they can be cast either by the so-called "squeeze-casting" method or by the conventional die casting method. The high stability and texture-free formation of the molded part mean that the very high casting speeds can be used, which is therefore especially suitable for the conventional, economically very attractive die-casting process.

As the comparison experiments show, the porosities which are necessary to achieve the infiltration rates normally used in die casting cannot be obtained by any of the other molding methods of powder technology. In addition, the solid fraction cannot be reduced to the low values which are achievable in accordance with the process of the invention.

The following examples are intended to explain the invention in greater detail without limiting it.

EXAMPLE 1
Gel Casting 1.5 vol. % of agar-agar, finely powdered, was dissolved in 73.5 vol. % of water as it was being heated to about 95° C. With stirring, 18 vol. % of silicon with a particle-size range of 1–100 μm and with a purity of >98% was added to the sol thus produced. After cooling to 60° C., 7.0 vol. % of soda-water glass (35%) was added. The thin slip thus obtained was poured into a metal negative mold of the desired geometry, which had been preheated to approximately 40° C. After cooling to 0–10° C., the part could be removed from the mold and was then deep-frozen at −30° C. In the frozen state, it was freeze-dried at 10–20° C. and <6 mbars. During the drying process, a linear shrinkage of about 6% occurred. After drying, the part was heated to 1,000° C. in an electrically heated furnace over the course of 3 hours to solidify it. During this heat treatment, linear shrinkage of approximately 1% occurred. In the solidified state, the part had a density of 0.6–0.65 g/cm$^3$, which, at a theoretical density of silicon of 2.33 g/cm$^3$, corresponds to a porosity of 72–74%. The strength was sufficient for handling and for mechanical processing.

EXAMPLE 2
Freeze Casting 1.5 vol. % of methylcellulose was dissolved in 73.5 vol. % of water. Under agitation, 18 vol. % of silicon with a particle-size range of 1–100 μm and with a purity of >98% was added. Then 7.0 vol. % of soda-water glass (35%) was added. The resulting thin slip was cast into a metal negative mold of the desired geometry. After the slip had been cooled to −30° C., the part was removed from the mold in the frozen state. At that point, it could have been either freeze-dried immediately or stored temporarily at −30° C. The freeze-drying and heat treatment operations were carried out in the same way as described in Example 1 (gel casting). The properties obtained were identical.

COMPARISON EXAMPLE 1
Isostatic Pressing

Silicon with a particle-size range of 1–100 μm and with a purity of >98% was loaded into a water-tight rubber mold with dimensions of 30×200 mm. After isostatic pressing at 1,000 bars, a molded part with a density of 1.57g/cm$^3$ was obtained. This corresponded to a porosity of 33%. A much lower degree of precompaction, that is, a higher porosity, was not possible, because otherwise the strength was not sufficient for handling. The green strength can be increased by the addition of organic binders. Reducing the applied pressure to 400 bars resulted in a molded part with a density of 1.43 g/cm$^3$, which corresponds to a porosity of 39%. These low and in some cases narrow porosities are insufficient to allow the molded part to be infiltrated with a molten metal rapidly and homogeneously under only a limited increase in pressure.

COMPARISON EXAMPLE 2
Core Shooting

Silicon with a particle-size range of 1–100 μm and with a purity of >98% was mixed with a reactive organic binder. The core shooting process was used to produce molded parts with densities similar to those obtained by isostatic pressing (1.2–1.5 g/cm$^3$). The porosity was only slightly higher and led to the same difficulties with infiltration as those encountered in the case of the parts molded by isostatic pressing.

What is claimed is:

1. A process for the production of a porous molded part comprising the steps of:

dispersing a metallic or nonmetallic solid material, at least one inorganic binder, and at least one organic binder in water to form a casting slip;

gel casting or freeze casting the casting slip into a negative casting mold to form a molded part;

removing the molded part from the casting mold;

freezing the gel cast removed molded part or maintaining the freeze cast removed molded part in a frozen state;

the frozen molded part under a vacuum of no more than 600 Pa (6 mbars) at 0–60° C. to form a green compact; and heating the green compact in air in a shield gas atmosphere, or under vacuum to 1500° C., while maintaining the maximum heating temperature for up to 5 hours to form the molded porous part.

2. The process of claim 1 wherein the at least one organic binder is at least one of a water-soluble and a dispersible binder.

3. Method of claim 1, wherein said at least one organic binder comprises at least one binder selected from the group consisting of methylcellulose, polyvinyl alcohol, alginate, starch, or agar-agar.

4. The process of claim 3 further comprising adding at least one of an extender and antifoaming agent to the dispersion.

5. The process of claim 1, wherein the casting slip is heated to a temperature of over 90° C. and stirred.

6. The method of claim 1, wherein the pores of the molded porous part are from 2–5 times larger than the average particle size of the metallic or nonmetallic solid material.

7. The method of claim 1, wherein said nonmetallic solid material is selected from the group consisting of carbon, natural polymers and synthetic polymers; and said metallic solid material is at least one metallic material selected from the group consisting of copper, brass, bronze, magnesium, zinc, lead, aluminum, silicon, titanium, vanadium, manganese, iron, cobalt, chromium, molybdenum and nickel.

8. The method of claim 7, wherein said solid material is selected from the group consisting of intermetallic phases of copper, brass, bronze, magnesium, zinc, lead, aluminum, silicon, titanium, vanadium, manganese, iron, cobalt, chromium, molybdenum and nickel.

9. The method of claim 7, wherein the solid material is a carbide, nitride, silicide, boride, or oxide of the metallic material.

10. The method of claim 7, wherein the metallic material comprises a combination of at least two metallic materials.

11. The method of claim 7, wherein said at least one inorganic binder is at least one of a phosphate, borate, sulfate, oxide, or silicate.

12. The method of claim 1, wherein the solid material is selected from the group consisting of silicon, silicon carbide, titanium carbide, and Fe$_3$C and the at least one inorganic binder is soda-water glass.

13. The method of claim 1, wherein the solid material is used in amounts of 10–40 vol. %, have a particle size of 0.5–500 μm, and the at least one inorganic binder is used in amounts of from 1–15 vol. %.

14. The method of claim 1, wherein the solid material is used in amounts of 15–30 vol. %, have a particle size of 1.0–200 μm, and the at least one inorganic binder is used in amounts of from 3–7.0 vol. %.

* * * * *